United States Patent [19]

Brown

[11] Patent Number: 4,706,934
[45] Date of Patent: Nov. 17, 1987

[54] GATE VALVE

[75] Inventor: George W. Brown, Garden Grove, Calif.

[73] Assignee: Mark Controls Corporation, Skokie, Ill.

[21] Appl. No.: 899,539

[22] Filed: Aug. 22, 1986

[51] Int. Cl.⁴ ............................................. F16K 25/00
[52] U.S. Cl. ..................... 251/87; 251/167; 251/195; 251/197
[58] Field of Search .................. 251/84, 87, 167, 195, 251/197, 199

[56] References Cited

U.S. PATENT DOCUMENTS

| | | | |
|---|---|---|---|
| 166,083 | 7/1875 | Eddy | 251/197 |
| 332,939 | 12/1885 | Old | 251/195 |
| 1,134,811 | 4/1915 | Berger | 251/191 X |
| 3,040,773 | 6/1962 | McInerney | 251/195 X |
| 3,695,578 | 10/1972 | Walther | 251/94 |
| 4,301,993 | 11/1981 | Waller | 251/167 |

Primary Examiner—Harold W. Weakley
Attorney, Agent, or Firm—Willian Brinks Olds Hofer Gilson & Lione Ltd.

[57] ABSTRACT

A gate valve includes a body which includes first and second valve seats. First and second gates are mounted for movement adjacent to the valve seats, and each of the gates has an outer face adapted to seal against the respective valve seat and an inner face which defines a thrust pad. A wedge is interposed between the first and second gates, and the wedge defines first and second converging wedge faces rigidly positioned with respect to one another to bear against the respective thrust pads. At least one of the thrust pads and the wedge faces defines a convex surface. A hand wheel axially moves the wedge with respect to the body and the wedge is coupled to the gates such that movement of the wedge away from the valve seats moves the gates away from the valve seats. The convex surface allows the respective gate to articulate with respect to the wedge as necessary to align with the valve seat. The wedge is coupled to an actuating member shaped to abut the gates, and springs are placed between the wedge and the gates to bias the gates into contact with the actuating member.

7 Claims, 6 Drawing Figures

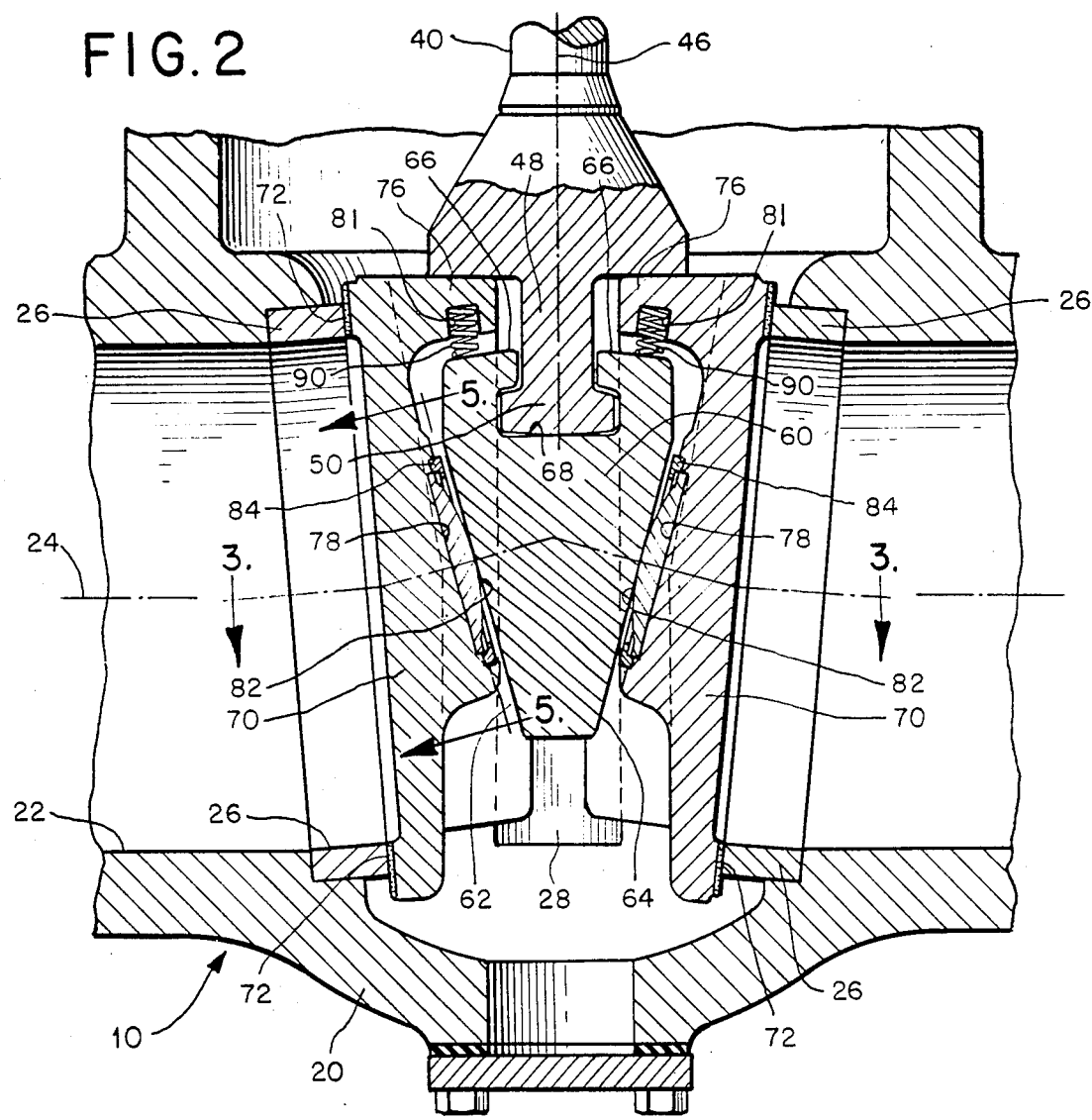
FIG. 2
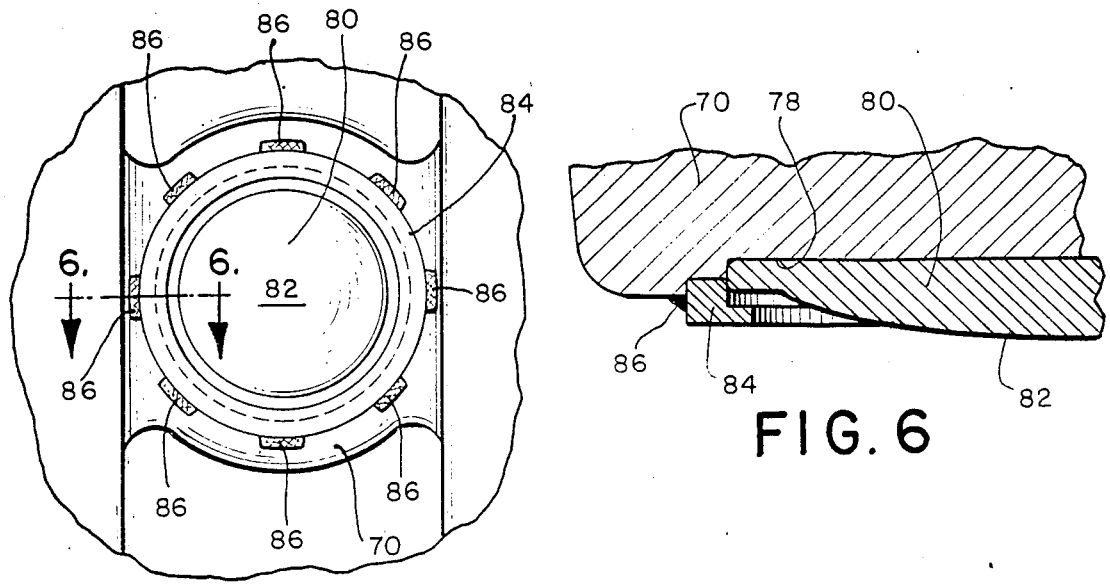
FIG. 5
FIG. 6

GATE VALVE

BACKGROUND OF THE INVENTION

The present invention relates to gate valves of the type having a pair of gates movable in a valve body between open and closed positions, with a wedge interposed between the gates to urge the gates against corresponding valve seats in the valve body.

Walther U.S. Pat. No. 3,695,578, and DE-AS 1 150 250 illustrate two prior art gate valves of the general type described above. In both of these gate valves, a wedge assembly made up of two wedge halves interconnected by a ball and socket joint is used to move the gates between the open and closed positions, and to provide a sealing force tending to seat the gates against the valve seats. The use of such an internal wedge assembly provides important advantages in reducing the tendency of the valve to jam in the closed position. Such jamming can result from stresses associated with temperature changes of the valve when in the closed position. The internal wedge assembly eliminates such jamming by relative movement between the internal wedge assembly and the gates. This relative movement occurs before the gates are unseated from the valve faces, and it reduces sealing forces on the gates as the gates move to the open position.

The gate valve design illustrated in the above-identified patents brings with it disadvantages due to the complex structure of the wedge assembly. The wedge assembly itself is made up of three component parts which must be assembled properly prior to the assembly of the gate valve. These multiple component parts unnecessarily increase the cost, complexity and maintenance difficulties associated with the valve. Furthermore, the three-part wedge assembly defines a large number of surfaces that may collect scale or other solid deposits which may interfere with proper operation of the valve.

SUMMARY OF THE INVENTION

The present invention is directed to improvements to the gate valves described above which to a large extent overcome these disadvantages.

According to a first aspect of this invention, a gate valve is provided which comprises a body comprising first and second valve seats. First and second gates are provided, each having an outer face shaped to seal against a respective one of the valve seats and an inner face comprising a respective thrust pad. A wedge is interposed between the first and second gates. This wedge defines first and second converging wedge faces rigidly positioned with respect to one another, each positioned to bear against a respective one of the thrust pads. At least one thrust pad or wedge face defines a convex surface. Means are provided for axially moving the wedge with respect to the body and means are provided for coupling the wedge to the gates such that movement of the wedge away from the valve seats moves the gates away from the valve seats. The convex surface allows the respective gate to articulate with respect to the wedge as necessary to align with the respective valve seat.

According to a second aspect of this invention, a gate valve is provided which comprises a body that comprises first and second valve seats; first and second gates, each having an outer face shaped to seal against a respective one of the valve seats; and guide means for guiding movement of the gates along an axis between a closed position, in which the gates are aligned with the valve seats, and an open position. Wedge means are interposed between the gates for varying the separation between the gates in response to relative movement between the wedge means and the gates. An actuating member is coupled to the wedge means to move the wedge means along the axis, and means are mounted on the actuating member for abutting against the gates to apply forces to the gates tending to move the gates to the closed position. Spring means are provided for biasing the gates against the abutting means and away from the wedge means.

As pointed out in detail below, the preferred embodiment of this invention utilizes a one-piece, rigid wedge in place of the three-piece wedge assembly of the prior art. This one-piece wedge is relatively simple to manufacture, to assemble on the valve stem, and to maintain. It provides excellent reliability, even in conditions where scale or other solid deposits accumulate on the interior components of the valve, due to the reduced number of surfaces on which such solid deposits can accumulate. Moreover, this embodiment allows the gate to articulate freely with respect to the wedge, thereby allowing the gate to orient itself as necessary to seat firmly on the valve seat.

The second aspect of this invention provides advantages in that the spring means preserves a separtion between the gates and the wedge means as the gates are moved to the closed position. For this reason, the wedge means is free to move with respect to the gates when the actuating member is moved to open the gates, and thus the wedge means is properly positioned to relieve forces tending to stick the gates in the closed position.

The invention itself, together with further objects and attendant advantages, will best be understood by reference to the following detailed description, taken in conjunction with the accompanying drawings.

BRIEF DESCRIPTION OF THE DRAWINGS

FIG. 2 is an enlarged view of a portion of the section of FIG. 1.

FIG. 5 is a fragmentary plan taken along line 5—5 of FIG. 2.

FIG. 6 is a fragmentary section taken along line 6—6 of FIG. 5.

DETAILED DESCRIPTION OF THE PRESENTLY PREFERRED EMBODIMENTS

Figure 1:
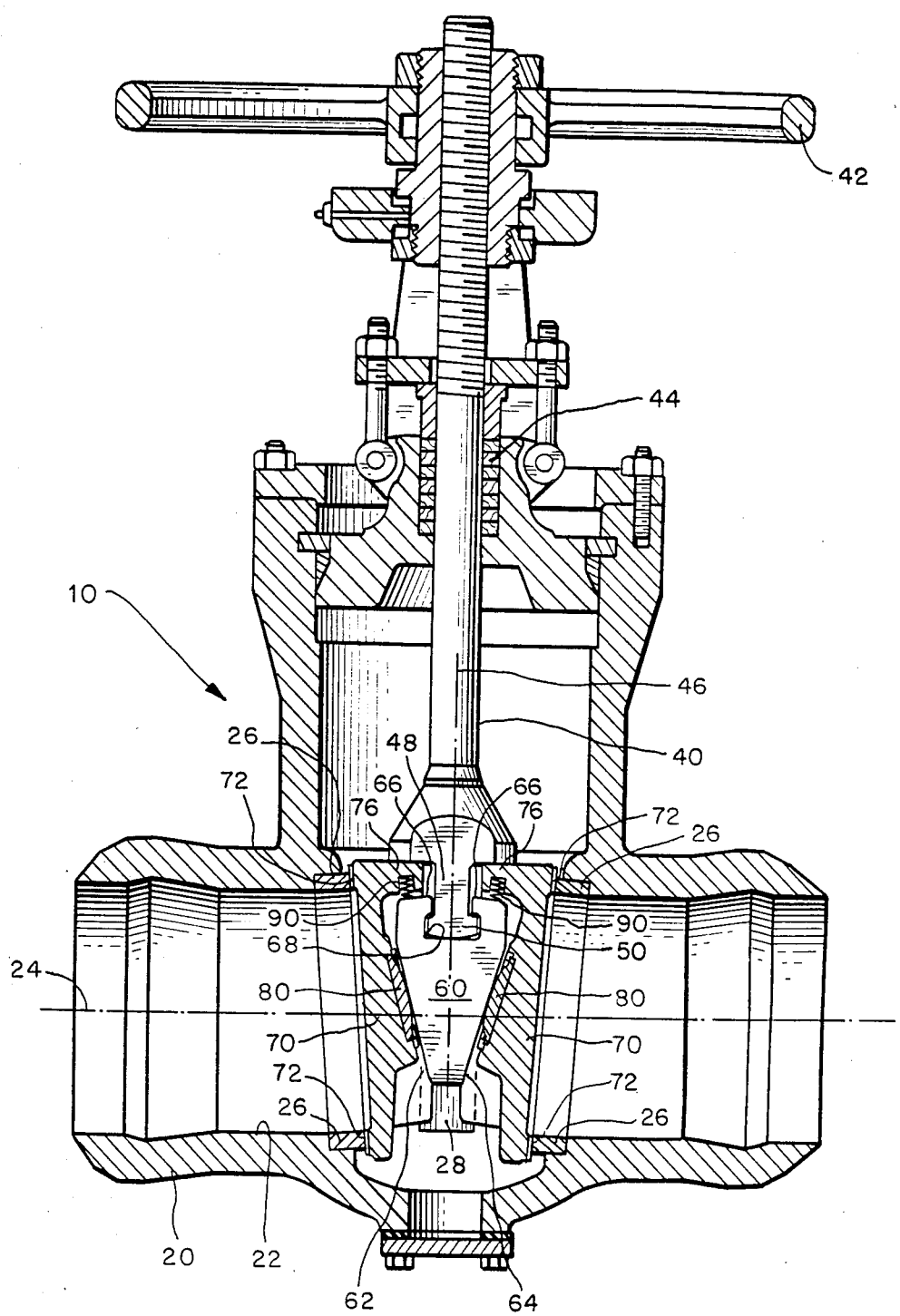
FIG. 1 is a longitudinal cross section of a gate valve which incorporates a presently preferred embodiment of this invention.

Turning now to the drawings, FIGS. 1 and 2 show a longitudinal cross-section of a valve 10 which incorporates a presently preferred embodiment of this invention. This valve 10 includes a valve body 20 which defines a flow passage 22 centered about a flow axis 24. Two circular valve seats 26 are rigidly mounted to the valve body 20 as shown in FIG. 1 such that each of the valve seats 26 is tilted at a small angle such as 5° with respect to a reference plane transverse to the flow axis 24. The valve body 20 also defines two spaced parallel guide recesses 28, each oriented transverse to the above-referenced flow axis 24.

The valve body 20 mounts a valve stem 40 for axial movement along a stem axis 46 which is oriented transverse to the flow axis 24 (FIG. 1). The position of the stem 40 along the stem axis 46 is controlled by a hand wheel 42 which is mounted for rotation with respect to the valve body 20. A conventional packing 44 eliminates leakage out of the valve 10 around the stem 40. The end of the stem 40 nearer the flow passage 22 defines a head 50 which is connected to the remainder of the stem 40 by a reduced rectangular section neck 48.

Figure 4:
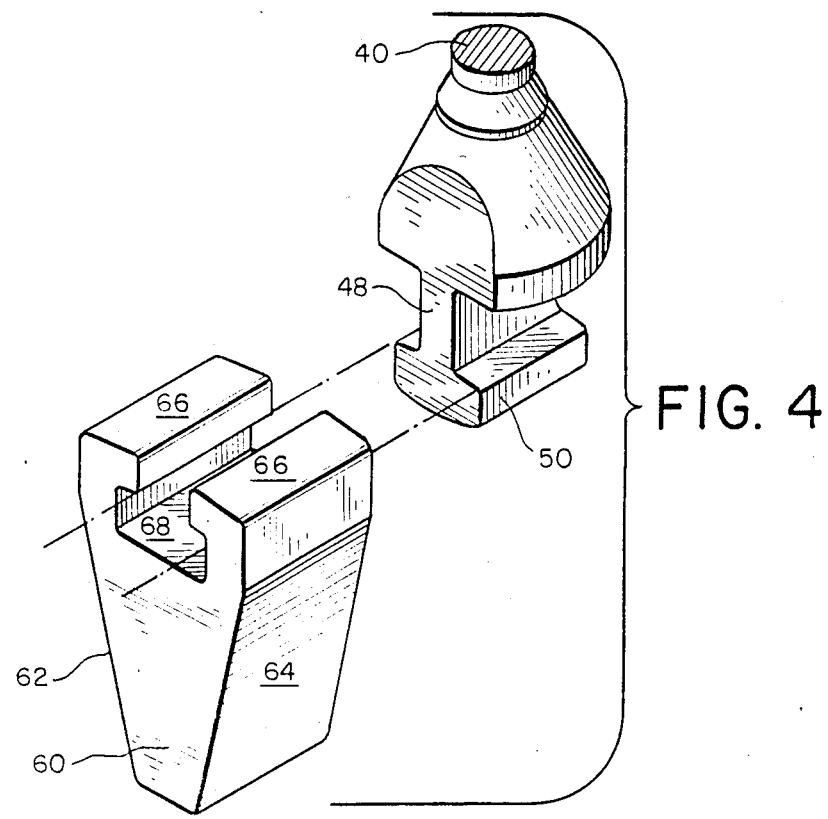
FIG. 4 is a fragmentary perspective of the wedge of the embodiment of FIG. 1.

A one-piece, integral wedge 60 (FIG. 4) defines a pair of spaced wedge faces 62,64, each disposed in this preferred embodiment at an angle of about 15° with respect to the stem axis 46. The wider end of the wedge 60 defines a transverse face 66, and a recess 68 is formed in the transverse face 66. This recess 68 is sized to receive the head 50 of the stem 40 in a mechanically interlocking fit. Thus, the wedge 60 is firmly secured to the stem 40, and the wedge 60 moves along the stem axis 46 in unison with the stem 40.

Figure 3:
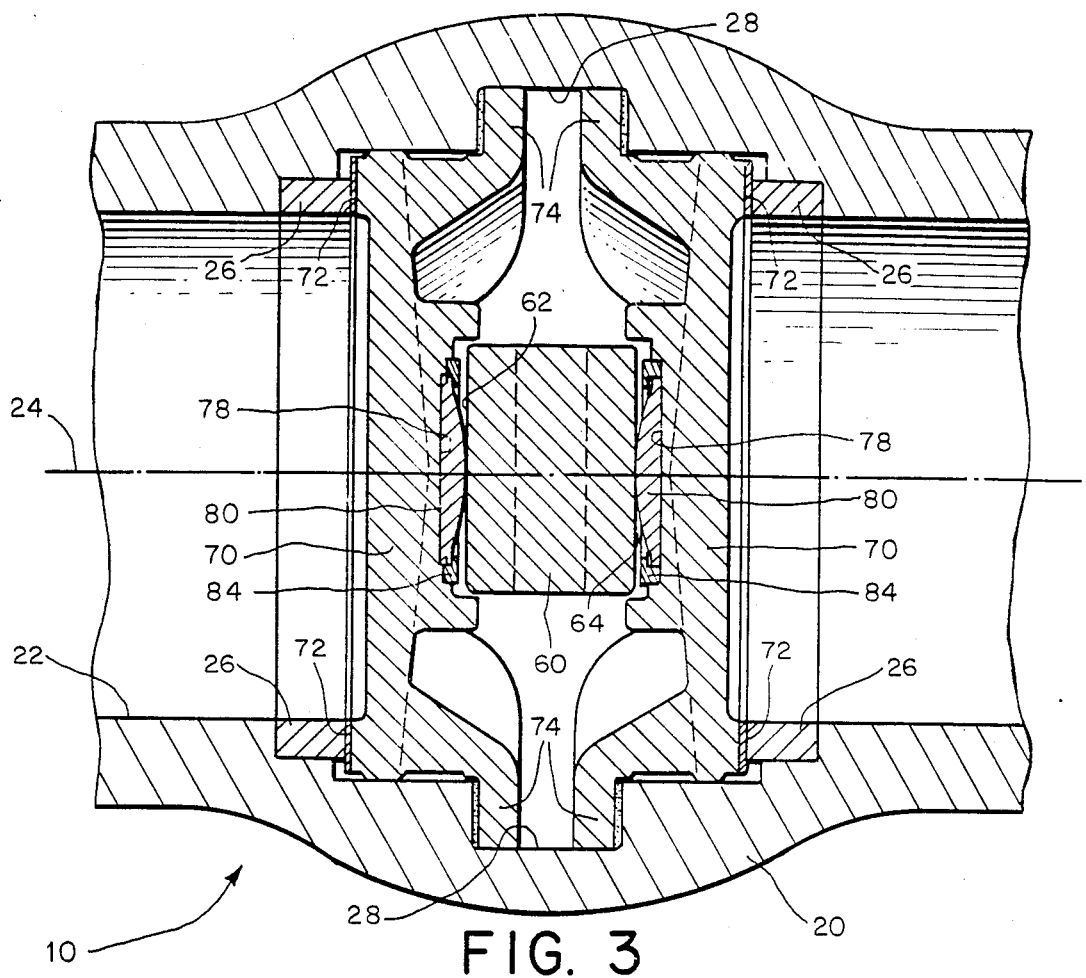
FIG. 3 is a cross section taken along line 3—3 of FIG. 2.

As best shown in FIGS. 1-3, the valve 10 includes two valve gates 70. Each of the valve gates 70 defines a seal face 72 shaped to seal against the respective valve seat 26. In addition, each of the gates 70 defines a pair of flanges 74 (FIG. 3), shaped and positioned to fit within respective ones of the guide recesses 28. The flanges 74 cooperate with the guide recesses 28 to guide movement of the gates 70 along respective translation axes oriented transversely with respect to the flow axis 24. In addition, each of the gates 70 defines a respective lip 76 shaped to overlie a portion of the transverse face 66 of the wedge 60.

Each of the gates 70 defines a circular recess 78 positioned opposite the adjacent wedge face 62,64 of the wedge 60. In addition, each of the lips 76 defines a pair of spring-receiving recesses 81 (FIG. 2) situated directly opposite the transverse face 66 of the wedge 60.

As best shown in FIGS. 2 and 5, a thrust pad 80 is positioned within each of the recesses 78. Each of the thrust pads 80 defines a spherically convex surface 82, and each of the thrust pads 80 is held in position by a respective retaining ring 84. The retaining rings 84 are preferably welded to the gates 70 at spot-welds 86 to hold the thrust pads 80 securely in place. In this embodiment, the thrust pads 80 are formed as separate components from the gates 70 in order to minimize manufacturing costs. The thrust pads 80 are preferably formed of a hard, wear-resistant material, and by separating the thrust pad 80 from the gate 70 in many applications it is possible to use other, less expensive materials for the gates 70. However, it should be understood that in alternate embodiments the thrust pads 80 can easily be formed as integral parts of the gates 70.

A coil spring 90 (FIG. 2) is mounted in each of the spring-receiving recesses 81 to bear at one end against the lip 76 of the associated gate 70 and to bear at the other end against the transverse face 66 of the wedge 60. As explained in detail below, these coil springs 90 help to maintain the gates 70 in alignment with one another with respect to movement along the stem axis 46.

Simply by way of illustration, the following details of construction are provided in order better to define the best mode of this invention. However, it should be clearly understood that these details of construction are in no way intended to be limiting.

In this embodiment the coil springs 90 are preferably formed of a high temperature alloy, such as Inconel X-750. In this embodiment each of the springs 90 has approximately 0.090 inches of travel, and each supports slightly more than one-half the weight of the respective gate 70. For example, in a ten-inch valve, each of the gates 70 weighs approximately 65 pounds, and the combined force supplied by the two springs 90 bearing on a single gate 70 supplies a spring force of about 70 pounds when in the relaxed state, and of about 75 pounds when in the compressed state. These coil springs 90 prevent axial misalignment of the gates 70 along the stem axis 46. This can be particularly important when the valve 10 is used with the stem axis 46 extending horizontally. In this embodiment, the radius of curvature of the convex surfaces 82 is 4.75 inches.

The material used for the valve body 20, the gates 70, and the retaining ring 84 will depend largely on the particular application, and should be chosen according to conventional engineering standards. Preferably, the gates 70, the retaining rings 84, and the guide recesses 28 on the valve body 20 are overlaid with a hard material such as Stellite No. 6 (a trademark of the Cabot Corporation) with a layer thickness of approximately ⅛th of an inch on all surfaces. In each case, a weld overlay operation is used to provide a hard, wear-resistant surface of Stellite. The thrust pads 80 in this preferred embodiment are also preferably formed of Stellite No. 6. In this embodiment, the wedge 60 is preferably formed of a 12% chrome stainless steel, heat treated to a hardness of 350 HB. Castings grade ASTM 217 Type CA15 has been found to be suitable. Details of construction relating to the hand wheel 42, the packing 44 and the remainder of the valve body 20 are conventional and form no part of this invention. They will not therefore be described in any greater detail here. Of course, it should be understood that a wide variety of actuating means can be substituted for the hand wheel 42, including a full range of hydraulic, pneumatic and electrically powered actuators.

In operation, the valve 10 efficiently seals the flow passage 22 while substantially preventing the formation of a mechanical jam that might interfere with opening of the valve or impose extreme wear conditions on the valve seats 26. When the hand wheel 42 is used to move the stem 40 and the wedge 60 toward the closed position, the wedge 60 causes the gates 70 to move toward the flow axis 24. The coil springs 90 maintain a constant spacing between the transverse face 66 of the wedge 60 and each of the gates 70, thereby preserving axial alignment of the gates 70 along the stem axis 46. Once the gates 70 reach the closed position shown in FIG. 1, further rotation of the hand wheel 42 advances the wedge 60 with respect to the gates 70, thereby providing a seating force which securely holds the seal faces 72 against the valve seats 26. The spherically convex surfaces 82 of the thrust pads 80 allow the gates 70 to articulate about the wedge faces 62,64 as necessary to align properly with the valve seats 26.

When it is desired to open the valve 10, the hand wheel 42 is used to move the wedge 60 away from the flow axis 24. Initially, the wedge 60 moves with respect to the gates 70, thereby removing the sealing force tending to hold the seal faces 72 against the valve seats 26. In the event that temperature changes or the like have imposed excessive forces tending to hold the gates 70 in position, this initial movement of the wedge 60 releases these forces, thereby allowing the seal faces 72 to move easily past the valve seats 26 without undue friction or wear.

Thus, the important advantages of the internal wedge design are obtained with a simple, onepiece wedge 60 which is relatively easy to manufacture, assemble and maintain. Because the thrust pads 80 are securely captured in place on the gates 70, and because the wedge 60 is itself a one-piece element, the valve 10 includes a minimum number of parts which are rugged, and easy to assemble.

The springs 90 cooperate with the wedge 60 and the lips 76 to ensure more reliable operation of the valve 10. In particular, as the gates 70 are being moved to the closed position, the springs 90 ensure that the lips 76 are urged into contact with the abutting surfaces of the actuating member 40 and away from the wedge 60. In this position of the gates 70 there is a space between the lips 76 and the upper face of the wedge 60, as shown in FIG. 2, as the gates 70 come into contact with the valve seats 26. As explained above, the valve seats 26 are angled at approximately 5° with respect to the flow axis 24 and thus define an included angle of 10°, while the wedge faces 62,64 define an included angle of 30°. The actuating member 40 directly abuts the lips 76 and moves the gates 70 across the valve seats 26 to close the valve 10 securely. The relatively small included angle of 10° ensures that adequately high closing forces can be developed with the actuating member 40. With the gates 70 in this position, it is the smaller included angle of the seats 26, and not the larger included angle of the wedge faces 62,64, that determines the relationship between the magnitude of the closing forces and the forces on the actuating member 40.

The springs 90 provide the further advantage that they ensure proper operation of the wedge 60 when the valve 10 is opened. Because the springs 90 create a space between the upper face 66 of the wedge 60 and the gates 70, forces on the actuating member 40 tending to open the valve 10 first move the wedge 60 upwardly, toward the gate lips 76. This provides relative movement between the wedge 60 and the gates 70, and allows the wedge 60 to reduce the separation between the gates 70, and thereby to relieve forces tending to cause the gates 70 to stick in the closed position.

Of course, it should be understood that a wide range of changes and modifications can be made to the preferred embodiment described above. As pointed out above, a wide variety of actuating devices can be provided to move the wedge, and the thrust pads 80 can be formed as an integral part of the gates 70. In alternate embodiments, the wedge faces 62,64 can be provided with a convex surface which bears against a planar surface on the gates 70. Of course, materials, dimensions and angles can all be modified as necessary to suit the intended application. In addition, the two features of this invention described above can be used independently of each other. It is therefore intended that the foregoing detailed description be regarded as illustrative rather than limiting, and that it be understood that it is the following claims, including all equivalents, which are intended to define the scope of this invention.

I claim:

1. A gate valve comprising:
    a body which defines a flow passage aligned with a flow axis;
    a pair of spaced valve seats mounted to the body around the flow passage, each valve seat defining a seat face canted at a small angle with respect to a reference plane perpendicular to the flow axis;
    a wedge having an end face and two spaced wedge faces rigidly positioned with respect to one another, said wedge faces converging in a first, valve closing direction and diverging in a reverse, valve opening direction;
    means for moving the wedge transverse to the flow axis in the valve closing and valve opening directions;
    first and second gates, each comprising a respective flange positioned to overlie the end face of the wedge and a respective convex thrust pad positioned to bear against a respective wedge face; and
    at least two springs, each mounted between the wedge and a respective one of the flanges to bias the flanges away from the wedge.

2. The invention of claim 1 wherein each of the thrust pads is spherically convex.

3. The invention of claim 1 wherein the springs support the weight of the respective gates so as to hold the wedge faces in contact with the thrust pads.

4. The invention of claim 1 wherein each of the thrust pads is mounted to the respective gate by a mounting ring.

5. The invention of claim 1 wherein the wedge moving means comprises:
    a stem mechanically interlocked with the wedge; and
    means for moving the stem in the valve opening and valve closing directions.

6. The invention of claim 5 wherein the means for moving the stem comprises a hand wheel coupled to the stem.

7. The invention of claim 1 wherein the wedge is formed of an integral, one-piece mass of metal.

* * * * *